United States Patent Office 2,961,433
Patented Nov. 22, 1960

2,961,433

POLYMERIZATION OF ACRYLONITRILE EMPLOYING A HALIDE OF A TRANSITION METAL AND THE BOROHYDRIDE OF AN ALKALI METAL

William J. Linn, Wilmington, Del., assignor to E. I. du Pont de Nemours and Company, Wilmington, Del., a corporation of Delaware No Drawing. Filed Nov. 29, 1956, Ser. No. 624,992

7 Claims. (Cl. 260—88.7)

This invention relates to the polymerization of acrylonitrile.

Polyacrylonitrile has attained a high place industrially because of its unique properties, especially for textile uses. It is currently made by the free radical-catalyzed polymerization of acrylonitrile. Although this procedure is satisfactory, competition demands continued interest in new catalysts which yield high molecular weight, colorfree polymer under conditions milder than those now required. An object of this invention is, accordingly, provision of novel catalyst systems for the polymerization of acrylonitrile.

Another object is provision of a new and improved method for the polymerization of acrylonitrile employing the novel catalyst systems.

The above-mentioned and yet other objects are achieved in accordance with the invention by contacting acrylonitrile in an aqueous reaction medium with a catalyst comprising a combination of a halide of a transition element selected from the group consisting of vanadium, titanium and iron and an alkali metal borohydride and acidifying the mixture of catalyst and acrylonitrile with a strong acid to a pH below 2. The product is a clear polyacrylonitrile with a high molecular weight.

In practice acrylonitrile is charged to a reactor containing an organic reaction medium, conveniently dimethylformamide, a metal halide such as vanadium oxytrichloride, titanium tetrachloride, or ferric chloride, and an alkali metal borohydride, such as lithium borohydride. To this mixture there is then added water and a strong acid, such as hydrochloric, in amount sufficient to reduce the pH of the system to below 2 and the system is permitted to stand at room temperature with agitation for at least 30 minutes. Thereafter polymer is recovered by filtration, washed, and dried.

The transition metal halides of the present catalytic systems are those of vanadium, iron and titanium. Specific examples are vanadium tetrachloride, vanadium trichloride, vanadium oxytrichloride, titanium tetrachloride, titanium trichloride, and ferric chloride.

The alkali metal borohydrides are those of sodium, lithium, potassium, and cesium. The preferred alkali metal borohydride is sodium borohydride because it is the least expensive and can be conveniently prepared as standard solutions in dimethylformamide.

The amount of transition metal halide used will generally vary between 0.05 to 1.0 mole percent of the acrylonitrile. The alkali metal borohydride is used in a mole ratio of 0.75 to 5.0 times the transition metal halide.

The reaction medium is water alone or water and dimethylformamide. The amount of reaction medium preferably equals or exceeds that of the acrylonitrile.

Any strong acid can be employed in reducing the pH of the medium to below 2. Hydrochloric acid is preferred since it is cheap and gives excellent results. Other acids which can be used include chloroacetic, phosphoric and sulfuric acids.

Temperature and pressure are not particularly important variables in the process of the invention. Temperatures between about the freezing and boiling points of the catalytic systems are usable with room temperature, i.e., about 18–25° C., preferred because of convenience. Atmospheric pressures are also convenient although both elevated and lowered pressures are usable.

The examples which follow illustrate but do not limit the invention. Unless otherwise specified, inherent viscosities refer to values determined at 0.2% concentration in dimethylformamide at 25° C.

Example 1

(a) A 500-ml. three-necked flask fitted with a stirrer, condenser, dropping funnel containing 50 ml. of acrylonitrile and nitrogen inlet was flame-dried and flushed with dry nitrogen. There was then added under a nitrogen blanket 100 ml. of dimethylformamide and 2.0 ml. of a cyclohexane solution of vanadyl trichloride which contained 1 millimole per milliliter of vanadyl trichloride (0.26 mole percent based on acrylonitrile). To this was added 0.22 g. (0.01 mole) of lithium borohydride. The reaction mixture, which was first light green, turned black upon the addition of the borohydride.

The acrylonitrile in the dropping funnel was then added. The dark reaction mixture was stirred under nitrogen for 17 hours and then added to water containing concentrated hydrochloric acid. No polymerization had occurred as evidenced by the lack of a precipitate of polymer. After 10–15 minutes, polymer began to precipitate. At the end of 4 hours, the precipitate of polyacrylonitrile was collected by filtration, washed with dilute hydrochloric acid, filtered, washed with methanol, and dried. The weight of powdery, colorless polymer of inherent viscosity 2.37 was 17.1 g., or a conversion of 42%.

(b) The experiment which follows shows that in the absence of the vanadyl trichloride catalyst, low molecular weight, colored polymer is obtained.

Example 1(a) was substantially repeated using 100 ml. of dimethylformamide and 0.22 g. of lithium borohydride. To this mixture there was added dropwise 50 ml. of acrylonitrile. The reaction was quite exothermic, and the solution became yellow. The reaction mixture was stirred for 16 hours and added to aqueous hydrochloric acid. This caused the immediate precipitation of a yellow polymer which after washing and drying weighed 10 g. and had an inherent viscosity of 0.07.

(c) The following experiment demonstrates the necessity of adding acid to the reaction mixture in order to initiate polymerization.

Example 1(a) was substantially repeated using 50 ml. of dimethylformamide and 2.0 ml. of a one-molar solution of vanadyl trichloride in cyclohexane. After the addition of 0.22 g. of lithium borohydride, 50 ml. of acrylonitrile was added dropwise over a period of 15 minutes. When the addition was complete, stirring was continued for 10 minutes and 50 ml. of water added all at once. No polymer precipitated and none was formed during the next 30 minutes. At this point, one milliliter of concentrated hydrochloric acid was added. After a short time, the reaction mixture became cloudy and polymer began to precipitate. One hour after the addition of the acid, the reaction mixture was filtered and the polymer washed repeatedly with water and methanol until it was colorless. There was obtained 23.6 g. (58% conversion) of polyacrylonitrile of inherent viscosity 2.03.

Example 2

(a) A 100-ml. three-necked flask fitted with thermometer, magnetic stirring bar, and nitrogen inlet was flame-dried and flushed with nitrogen. There was then added under nitrogen 20.0 ml. of dimethylformamide, 10.0 ml.

of acrylonitrile, and 0.75 ml. of a cyclohexane solution of vanadyl trichloride containing 1 millimole of the vanadyl trichloride per milliliter. To the flask there was then added 0.029 g. of sodium borohydride, which had previously been determined to be 77% pure. The temperature rose from 28° C. to 37° C. upon the addition of the borohydride. The reaction mixture was stirred under nitrogen for 30 minutes, and there was added 20.0 ml. of a solution which contained 10% concentrated hydrochloric acid and 90% distilled water. The reaction mixture was stirred for one hour and then allowed to stand at room temperature under nitrogen for 48 hours. The precipitated polymer was collected by filtration, washed with methanol, and dried. There was obtained 3.4 g. (42% conversion) of white, powdery polyacrylonitrile of inherent viscosity 1.09.

(b) Example 2(a) was substantially repeated using 0.057 g. (1.15 mmoles) of 77% sodium borohydride. The temperature rose from 28–40° C. upon the addition of the borohydride. There was obtained 5.8 g. (71.5% conversion) of polyacrylonitrile of inherent viscosity 1.70.

(c) Example 2(a) was substantially repeated using 0.113 g. (2.3 mmoles) of 77% sodium borohydride. The temperature rose from 28–42° C. upon the addition of the borohydride. There was obtained 3.9 g. (48% conversion) of polyacrylonitrile of inherent viscosity 1.49.

(d) Example 2(a) was substantially repeated using 0.189 g. (3.8 mmoles) of 77% sodium borohydride. In this experiment the ratio of sodium borohydride to vanadyl trichloride was, therefore, 5.1. Upon the addition of the borohydride, the temperature immediately rose from 28–121° C. When the hydrochloric acid solution was added, yellow polymer was precipitated immediately. The polymer was of low molecular weight as shown by an inherent viscosity of 0.13 and was evidently the result of initiation by excess sodium borohydride.

*Example 3*

A 100-ml. three-necked flask fitted with a magnetic stirring bar, nitrogen inlet, and thermometer was flame-dried and flushed with nitrogen. There was then added 40 ml. of a 2% aqueous solution of technical sodium "Dodecyl" sulfate and 0.75 ml. of a cyclohexane solution of vanadyl trichloride containing one millimole of vanadyl trichloride per milliliter. To the resulting suspension, there was added 0.057 g. (1.15 mmoles) of 77% sodium borohydride, followed by 10 ml. of acrylonitrile. After the suspension had been stirred for 10 minutes, 2.0 ml. of concentrated hydrochloric acid was added. After the reaction mixture had been stirred at room temperature for 17 hours, the precipitated polymer was collected by filtration, washed with methanol, and dried. The polyacrylonitrile weighed 4.2 g. (52% conversion) and was snow white.

*Example 4*

A standardized solution of sodium borohydride in dimethylformamide was prepared as follows: To 100 ml. of dimethylformamide there was added 17.5 g. of 77% commercial powdered sodium borohydride. This suspension was allowed to stand for one hour with occasional shaking and the insoluble material separated by filtration. The filtrate was diluted to 500 ml. with dimethylformamide. Standardization was carried out by an adaptation of a literature procedure for the determination of purity of sodium borohydride [Lyttle, Jensen and Struck, Anal. Chem., 24, 1843 (1952)]. To 25 ml. of 0.5 N sodium hydroxide was added 1.0 ml. of the borohydride solution. Immediately there was added 50 ml. of standard potassium iodate solution. The resulting solution was stirred vigorously for 30 seconds, and 2 g. of potassium iodide was added followed by 20 ml. of 4 N sulfuric acid. After the solution had stood in the dark for 2–3 minutes, the liberated iodine was titrated with sodium thiosulfate, using starch indicator. By this method the borohydride solution was determined to contain 0.616 millimole per milliliter.

To a 100-ml. flask fitted with magnetic stirrer, nitrogen inlet, and thermometer there was added 20.0 ml. of dimethylformamide, 10.0 ml. of acrylonitrile, and 1.0 ml. of an 0.83 molar cyclohexane solution of vanadyl trichloride. To this solution there was added 3.0 ml. of the above-described solution of sodium borohydride ($NaBH_4/VOCl_3 = 2.23$). After the mixture had been stirred for one hour, 20 ml. of a solution of 10% concentrated hydrochloric acid and 90% distilled water was added. The reaction mixture was stirred for 17 hours and the precipitated polyacrylonitrile was collected by filtration, washed with methanol, and dried. There was obtained 5.0 g. (62% conversion) of snow-white polymer.

*Example 5*

A 500-ml. three-necked flask fitted with stirrer, nitrogen inlet, and dropping funnel containing 50 ml. of acrylonitrile was flame-dried and flushed with nitrogen. The flask was charged with 100 ml. of dimethylformamide and 2.0 ml. of a one-molar cyclohexane solution of vanadyl trichloride. To this solution there was added 0.22 g. (10 mmoles) of lithium borohydride, followed by the drop-wise addition of the acrylonitrile contained in the dropping funnel. The suspension was stirred for 15 minutes and there was added 5.0 ml. of a 10% solution of hydrogen chloride gas in dimethylformamide.

After 45 minutes no polymer had been formed as evidenced by the lack of a precipitate when a small portion of the solution was added to water. At this time 50 ml. of water was added to the reaction mixture which then turned light blue. Shortly thereafter polymer began to precipitate. The reaction mixture was stirred for one hour after the addition of the water and the precipitated polymer collected by filtration. After it had been washed with methanol and dried, the polymer weighed 7.5 g. (18.5% conversion).

*Example 6*

Example 5 was substantially repeated using 1.0 ml. of concentrated hydrochloric acid instead of the solution of hydrogen chloride in dimethylformamide. Forty-five minutes after the acid had been added, there was no evidence of polymer formation. Therefore, 50 ml. of distilled water was added and polymer began to precipitate immediately. After the reaction mixture had been stirred for one hour the precipitated polyacrylonitrile was collected by filtration, washed with methanol, and dried. There was obtained 16.3 g. (40% conversion) of white polymer of inherent viscosity 1.26.

*Example 7*

A 100-ml. three-necked flask fitted with magnetic stirrer, nitrogen inlet, and thermometer was flame-dried and flushed with nitrogen. The flask was charged with 19.0 ml. of dimethylformamide and 10.0 ml. of acrylonitrile. To this mixture there was added 0.5 ml. of a cyclohexane solution of vanadyl trichloride (0.10 mmole, 0.067 mole percent based on acrylonitrile). To this solution there was added 0.31 millimole of sodium borohydride as a dimethylformamide solution. The reaction mixture was stirred for 45 minutes and there was added 20.0 ml. of a solution containing 5% concentrated hydrochloric acid and 95% water. The reaction mixture was stirred at room temperature for a total of 65 hours. There was obtained 4.7 g. (58% conversion) of polyacrylonitrile of inherent viscosity 2.76.

*Example 8*

Four identical polymerization reactors were assembled. In each was placed 20 ml. of dimethylformamide, 10 ml. of acrylonitrile, 0.75 millimole of vanadyl trichloride and 1.15 millimoles of sodium borohydride. The reaction mixtures were stirred for 30 minutes and to each was added 20 ml. of aqueous hydrochloric acid of varying concentrations. The pH of each mixture was measured by means of a pH meter. The polymerization reactions were continued for three hours and the polymers were isolated, as described previously. The pH of each reaction mixture and conversions to polymer were:

| Reaction No. | pH | Conversion (Percent) |
|---|---|---|
| 1 | 1.9 | 22.4 |
| 2 | 1.5 | 22.7 |
| 3 | 1.3 | 31.4 |
| 4 | 1.15 | 48.7 |

The results demonstrate that as the pH is lowered, the conversion to polymer is increased.

*Example 9*

(a) The procedure of Example 7 was followed using a charge consisting of 20.0 ml. of dimethylformamide and 10.0 ml. of acrylonitrile. To this was added 0.08 ml. of titanium tetrachloride (approximately 0.75 mmole). To the resulting solution there was added 0.082 g. (3.75 mmoles) of lithium borohydride. After the resulting light yellow solution had been stirred for 100 minutes, 20.0 ml. of a solution containing 10% concentrated hydrochloric acid and 90% water was added. Stirring was continued for 150 minutes during which time the precipitation of some polymer was noted. The reaction mixture was filtered and the polymer collected by filtration, washed, and dried. There was obtained 0.5 g. (6.2% conversion) of colorless polyacrylonitrile.

(b) Example 9(a) was substantially repeated using 20.0 ml. of dimethylformamide and 10.0 ml. of acrylonitrile. To this was added 0.20 g. (0.075 mmole) of ferric chloride hexahydrate. To the resulting clear yellow solution, 0.82 g. of lithium borohydride was added. The resulting brown-black reaction mixture was stirred for 100 minutes and 20.0 ml. of a 10% concentrated hydrochloric acid/90% distilled water solution was added. Stirring was continued for 150 minutes and the precipitated polymer collected by filtration. After it had been washed with dilute hydrochloric acid and methanol and dried, there was obtained 2.4 g. of colorless polyacrylonitrile.

(c) The procedure of Example 9(b) was substantially repeated using 0.12 g. of anhydrous ferric chloride in place of the ferric chloride hexahydrate. From this reaction there was obtained 2.79 g. (34.5% conversion) of colorless polyacrylonitrile.

The process of this invention provides a new catalyst combination and process which are highly effective for preparing high molecular weight, clear, polyacrylonitriles useful in all the normal applications of these materials, particularly with textiles.

Since obvious modifications in the invention will occur to those skilled in the chemical arts, I propose to be bound solely by the appended claims.

The embodiments of the invention in which an exclusive property or privilege is claimed are defined as follows:

1. In the polymerization of acrylonitrile, the improvement wherein an acrylonitrile composition is polymerized by bringing the same in contact with an aqueous system having a pH not greater than about 2 and containing a halide of a transition metal of the group consisting of vanadium, iron and titanium and the borohydride of an alkali metal.

2. The invention of claim 1 in which the system contains additionally dimethylformamide.

3. The invention of claim 2 in which the chloride is vanadyl trichloride.

4. The invention of claim 2 in which the chloride is ferric chloride.

5. The invention of claim 2 in which the chloride is titanium tetrachloride.

6. The invention of claim 2 in which the borohydride is sodium borohydride.

7. The invention of claim 2 in which the borohydride is lithium borohydride.

References Cited in the file of this patent

UNITED STATES PATENTS

| | | |
|---|---|---|
| 2,567,109 | Howard | Sept. 4, 1951 |
| 2,628,223 | Richards | Feb. 10, 1953 |
| 2,683,140 | Howard | July 6, 1954 |
| 2,728,757 | Field et al. | Dec. 27, 1955 |

FOREIGN PATENTS

| | | |
|---|---|---|
| 538,782 | Belgium | Dec. 6, 1955 |
| 152,881 | Australia | Aug. 19, 1953 |

UNITED STATES PATENT OFFICE
CERTIFICATION OF CORRECTION

Patent No. 2,961,433

November 22, 1960

William J. Linn

It is hereby certified that error appears in the above numbered patent requiring correction and that the said Letters Patent should read as corrected below.

Column 6, line 21, for "halide" read -- chloride --.

Signed and sealed this 6th day of June 1961.

(SEAL)
Attest:

ERNEST W. SWIDER
Attesting Officer

DAVID L. LADD
Commissioner of Patents